US011905910B2

(12) United States Patent
Yamamoto et al.

(10) Patent No.: US 11,905,910 B2
(45) Date of Patent: Feb. 20, 2024

(54) COOLING APPARATUS

(71) Applicant: SUBARU CORPORATION, Tokyo (JP)

(72) Inventors: Yuki Yamamoto, Tokyo (JP); Misaki Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/711,571

(22) Filed: Dec. 12, 2019

(65) Prior Publication Data

US 2020/0263628 A1 Aug. 20, 2020

(30) Foreign Application Priority Data

Feb. 19, 2019 (JP) ................................ 2019-027114

(51) Int. Cl.
*F02F 1/38* (2006.01)
*F01P 3/02* (2006.01)

(52) U.S. Cl.
CPC .................................... *F02F 1/38* (2013.01); *F01P 3/02* (2013.01); *F01P 2003/024* (2013.01); *F01P 2070/00* (2013.01)

(58) Field of Classification Search
CPC ........ F02F 1/14; F02F 1/36; F02F 1/38; F02F 1/40; F01P 3/02; F01P 2003/024; F16L 55/02736; F02M 31/20; F02M 35/10268
See application file for complete search history.

(56) References Cited

U.S. PATENT DOCUMENTS 2,892,618 A * 6/1959 Holm ...................... F28F 3/022 165/185
3,507,356 A * 4/1970 Smith ............... F16L 55/02736 181/224
4,407,359 A * 10/1983 Berger .................. F28D 9/0043 165/167
4,471,759 A * 9/1984 Anderson ............... B29C 66/80 126/626
(Continued)

FOREIGN PATENT DOCUMENTS

CN 202266341 U 6/2012
DE 19528168 A1 * 2/1997 ............ F28F 13/003
(Continued)

OTHER PUBLICATIONS

English machine translation of disclosure for JP 2000205783 A provided by ESPACENET (Year: 2021).*
(Continued)

*Primary Examiner* — Lindsay M Low
*Assistant Examiner* — Omar Morales
(74) *Attorney, Agent, or Firm* — TROUTMAN PEPPER HAMILTON SANDERS LLP

(57) ABSTRACT

A cooling apparatus includes a coolant passage provided in a device to be cooled. The coolant passage is configured in such a manner that coolant passes through the coolant passage. The coolant passage includes a wall surface, first ribs, and second ribs. The first ribs and the second ribs are provided on at least a part of the wall surface. The first ribs protrude from the wall surface toward inside of the coolant passage and extend in a first direction. The second ribs protrude from the wall surface toward the inside of the coolant passage and extend in a second direction crossing the first direction. The first ribs and the second ribs are disposed alternately when viewed in at least one direction.

20 Claims, 8 Drawing Sheets

(56) References Cited

U.S. PATENT DOCUMENTS

| | | | | | |
|---|---|---|---|---|---|
| 5,395,212 | A * | 3/1995 | Anzai | F01D 5/187 415/115 |
| 5,542,381 | A * | 8/1996 | Noda | F01P 3/02 123/41.74 |
| 6,382,907 | B1 | 5/2002 | Bregman et al. | |
| 2002/0170506 | A1* | 11/2002 | Ilzuka | F01P 11/00 123/41.1 |
| 2002/0170510 | A1* | 11/2002 | Lizuka | F02B 75/20 123/41.84 |
| 2003/0111026 | A1* | 6/2003 | Baba | F02B 77/02 123/41.82 R |
| 2005/0051114 | A1* | 3/2005 | Baba | F02F 1/40 123/41.55 |
| 2005/0229875 | A1* | 10/2005 | Maassen | F02F 1/40 123/41.82 R |
| 2014/0262170 | A1* | 9/2014 | Buckrell | F28F 1/128 165/151 |
| 2015/0377562 | A1* | 12/2015 | Buckrell | F24F 3/147 165/181 |
| 2016/0018167 | A1* | 1/2016 | Dziubinschi | F28F 3/044 165/177 |
| 2021/0108552 | A1* | 4/2021 | Hoag | F01P 3/02 |

FOREIGN PATENT DOCUMENTS

| | | | | |
|---|---|---|---|---|
| DE | 102015203472 | A1 * | 9/2016 | F28F 1/38 |
| EP | 1462751 | A1 * | 9/2004 | F28F 3/04 |
| FR | 2898406 | A1 * | 9/2007 | F28F 13/00 |
| FR | 3061442 | A1 * | 7/2018 | B22D 19/0072 |
| GB | 2023796 | A * | 1/1980 | F28D 1/0333 |
| JP | S59125395 | A | 7/1984 | |
| JP | 62-158138 | U | 10/1987 | |
| JP | 02223602 | A * | 2/1989 | |
| JP | 64-49652 | U | 3/1989 | |
| JP | H0510101 | A | 1/1993 | |
| JP | 2000205783 | A * | 7/2000 | F28D 1/0391 |
| JP | 2002102974 | A | 4/2002 | |
| JP | 2002102974 | A * | 4/2002 | B21C 37/151 |
| JP | 2002516944 | A | 6/2002 | |
| JP | 2002-221080 | A | 8/2002 | |
| JP | 2006077767 | A * | 3/2006 | F01D 5/187 |
| JP | 2007182777 | A * | 7/2007 | |
| JP | 2009162389 | A * | 7/2009 | |
| KR | 20020089137 | A * | 11/2002 | |
| KR | 20150116366 | A * | 10/2015 | |
| WO | WO-2017140851 | A1 * | 8/2017 | F28F 1/426 |
| WO | WO-2017203143 | A1 * | 11/2017 | F02B 29/0462 |

OTHER PUBLICATIONS

English machine translation of claims, description and Abstract of DE 19528168 A1 provided by ESPACENET (Year: 2021).*

Foreign Office Action dated Sep. 6, 2022; issued in Japanese Application No. JP2019-027114, with English Machine Translation; 7 pages.

* cited by examiner

COOLING APPARATUS

CROSS-REFERENCE TO RELATED APPLICATIONS

The present application claims priority from Japanese Patent Application No. 2019-027114 filed on Feb. 19, 2019, the entire contents of which are hereby incorporated by reference.

BACKGROUND

The disclosure relates to a cooling apparatus that makes coolant pass through a coolant passage that is formed in a device to be cooled.

Water-cooled engines are cooled by circulating coolant through a coolant passage or a water jacket by a pump during operation of the engine. The coolant passage is formed around a combustion chamber exposed to high-temperature combustion gas and an exhaust port in a cylinder head.

In such a water-cooled engine, an amount of heat received from the cylinder head by the coolant is desirably increased.

When the amount of heat received by the coolant is increased to enhance the cooling capacity, temperature rise of the combustion chamber is suppressed to prevent abnormal combustion, such as knocking, and an ignition timing advances to improve the thermal efficiency of the engine.

Strongly cooling the exhaust port decreases temperature of exhaust gas and also decreases temperature of a catalyst. This enables leaning an air-fuel ratio and improving fuel economy.

Meanwhile, in recent years, the coolant is also used as a heat source for accelerating warming of lubricating oil of an engine and a transmission after a vehicle is cold-soaked or is left in cold conditions. Increasing the received-heat amount of the coolant accelerates warming up of the engine and the transmission. As a result, friction is decreased early, thereby improving fuel economy of the vehicle.

A technique relating to a cooling structure of a water-cooled engine is disclosed in Japanese Unexamined Utility Model (Registration) Application Publication (JP-UM-A) No. 62-158138, for example. In this technique, dimples for roughing a surface are provided on a wall surface on a coolant path side of a wall separating the coolant path and a combustion chamber. The density of the dimples is increased toward a downstream side.

Japanese Unexamined Patent Application Publication No. 2002-221080 discloses a technique of forming a rugged surface on the surface facing a lower layer deck of a cylinder head, which is to be strongly cooled, of a water jacket of an engine. The rugged surface is formed by providing hemispherical convexes at predetermined intervals.

JP-UM-A No. 64-049652 discloses a technique of locally thinning a part, facing a water jacket, of a valve seat container that partially forms a combustion chamber. The thinned wall has a convex-concave shape on the water jacket side. Thus, a performance for radiating a heat from the valve seat to the coolant is improved.

SUMMARY

An aspect of the disclosure provides a cooling apparatus. The apparatus includes a coolant passage provided in a device to be cooled. The coolant passage is configured in such a manner that coolant passes through the coolant passage. The coolant passage includes a wall surface, first ribs, and second ribs. The first ribs and the second ribs are disposed on at least a part of the wall surface. The first ribs protrude from the wall surface toward inside of the coolant passage and extend in a first direction. The second ribs protrude from the wall surface toward the inside of the coolant passage and extend in a second direction crossing the first direction. The first ribs and the second ribs are disposed alternately when viewed in at least one direction.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the case of forming hemispherical convexes or concaves on a surface of a water jacket as in the techniques described above, a surface area that contributes to heat transfer is increased. Moreover, turbulence is generated in flow of surrounding coolant, whereby the received-heat amount of coolant is increased to some extent.

However, for example, in the case in which the hemispherical convexes and concaves are arranged periodically, the effect for generating turbulence varies with variation in an angle of a main flow direction of the coolant relative to the arrangement direction. The effect for generating turbulence is greatly decreased depending on the main flow direction. For this reason, for example, in the case in which the coolant irregularly flows in various directions due to the complicated shape of the water jacket in the cylinder head of the engine, there is room for improvement in that the cooling capacity may not be sufficiently improved.

It is desirable to provide a cooling apparatus having a coolant passage from which coolant receives a large amount of heat regardless of a direction in which the coolant flows in the coolant passage.

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

A description will be hereinafter made on a cooling apparatus according to a first embodiment of the disclosure.

The cooling apparatus of the first embodiment makes coolant circulate therethrough to cool a cylinder head of an engine that is mounted, as a traveling power source, on an automobile, such as a passenger car.

The coolant is, for example, a long life coolant containing water as a main component and additives, such as antifreezing agent and rust inhibitor.

Figure 1:
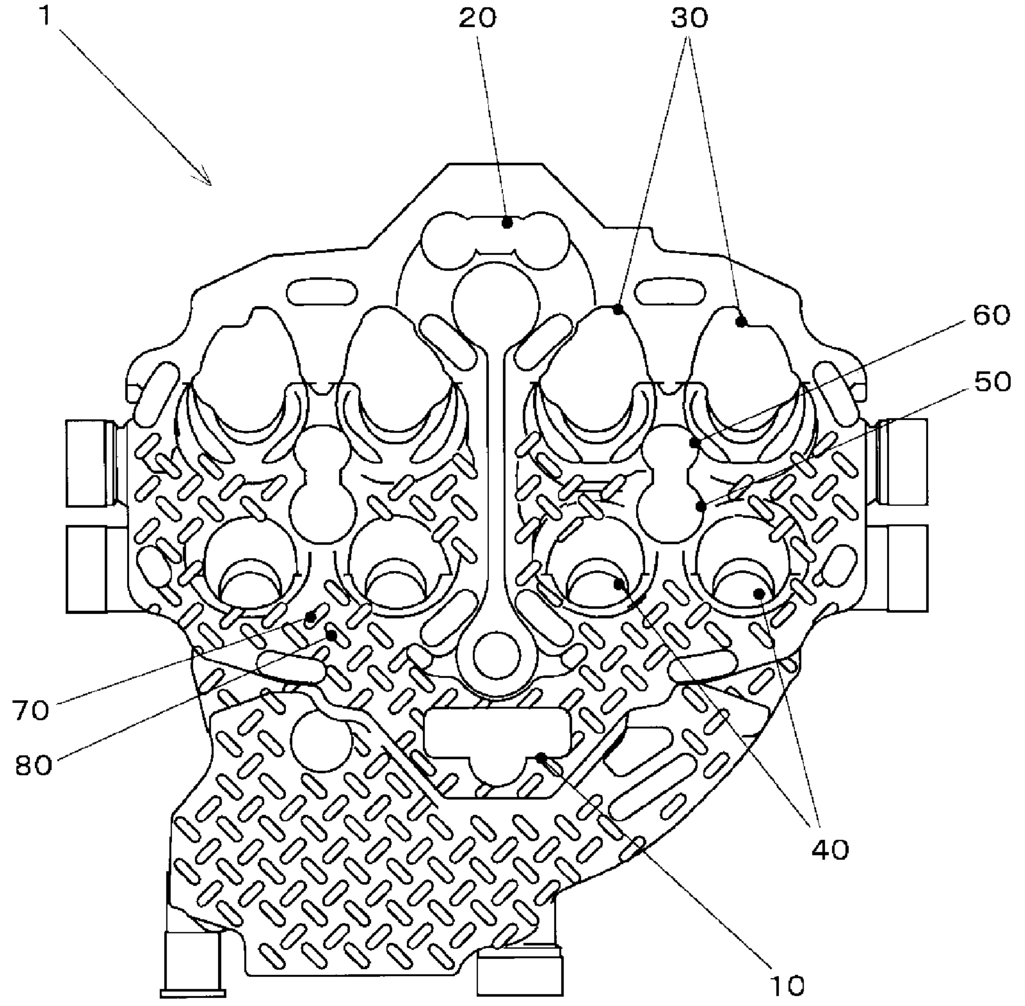
FIG. 1 illustrates a shape of a water jacket in a cylinder head to which a cooling apparatus of a first embodiment of the disclosure is applied.

FIG. 1 illustrates a shape of a water jacket in a cylinder head of an engine having the cooling apparatus of the first embodiment.

FIG. 1 illustrates a water jacket 1 when viewed in an axial line direction of the cylinder, which is not illustrated.

In one example in the first embodiment, the engine is a horizontally-opposed four-cylinder direct-injection gasoline engine. Combustion chambers of two cylinders are provided to each cylinder head.

In the first embodiment, two intake ports and two exhaust ports are provided to each of the cylinders, thereby forming a four-valve structure. The combustion chamber has a pent roof shape.

The cylinder head is, for example, formed by machining target parts of a workpiece of a casted aluminum alloy with a rough shape.

The cylinder head has a water jacket 1. In one example, the water jacket 1 may serve as a coolant passage configured such that coolant passes through the coolant passage. The water jacket 1 is, for example, formed to be hollow by using a core in casting.

The engine is driven in conjunction with rotation of a crankshaft that is an output shaft. The engine includes a water pump that sends the coolant.

The coolant that is sent by the water pump is introduced into the water jacket 1 from an inlet port 10 provided at a lower part of the water jacket 1 of the cylinder head, via a water passage formed in a cylinder block, which is not illustrated in the drawing.

The coolant receives heat while flowing through each part in the water jacket 1, to cool the cylinder head. Thereafter, the coolant is discharged from an outlet port 20 provided at an upper part of the water jacket 1.

The coolant that is discharged from the cylinder head passes through a radiator core, which is not illustrated in the drawing. This coolant is cooled by heat exchange with travel wind, for example, and returns to the water pump.

The water jacket 1 includes intake port passing members 30, exhaust port passing members 40, ignition plug passing members 50, and injector passing members 60. The intake port passing members 30 are formed while being partially sealed.

The intake port passing member 30 is provided in a region around an intake port that introduce combustion air or fresh air into the cylinder.

Two intake port passing members 30 are provided to each cylinder and are disposed side by side in an axial line direction of the crankshaft, which is not illustrated in the drawing. The axial line direction of the crankshaft is the right and left direction in FIG. 1.

The exhaust port passing member 40 is provided in a region around an exhaust port that discharges burnt gas or exhausts gas from the cylinder.

Two exhaust port passing members 40 are provided to each cylinder and are disposed on a lower side of the intake port passing members 30.

The ignition plug passing member 50 is provided around an ignition plug, which is not illustrated in the drawing. The ignition plug electrically generates spark and ignites an air-fuel mixture in the combustion chamber.

The ignition plug passing member 50 is provided at a center part of the combustion chamber when the water jacket 1 is viewed in a direction of the axial line of the cylinder.

The ignition plug passing member 50 is disposed in a region between the intake port passing member 30 and the exhaust port passing member 40.

The injector passing member 60 is provided in a region around an injector or an injection valve, which is not illustrated in the drawing. The injector injects fuel, such as gasoline, into the cylinder.

The injector passing member 60 is provided at an upper part of the ignition plug passing member 50 when the water jacket 1 is viewed in the direction of the axial line of the cylinder.

The upper part of the ignition plug passing member 50 and a lower part of the injector passing member 60 are continuously formed.

Plural first ribs 70 and plural second ribs 80 are arranged on a wall surface in a region on an exhaust side of the intake port passing member 30 of the water jacket 1, that is, a lower side in FIG. 1.

The first ribs 70 and the second ribs 80 protrude from the wall surface of the water jacket 1 toward inside of the water jacket 1.

For example, grooves may be formed in a core for forming the water jacket 1 in casting the cylinder head, so that the first ribs 70 and the second ribs 80 are formed as one body with the cylinder head by.

Figure 2:
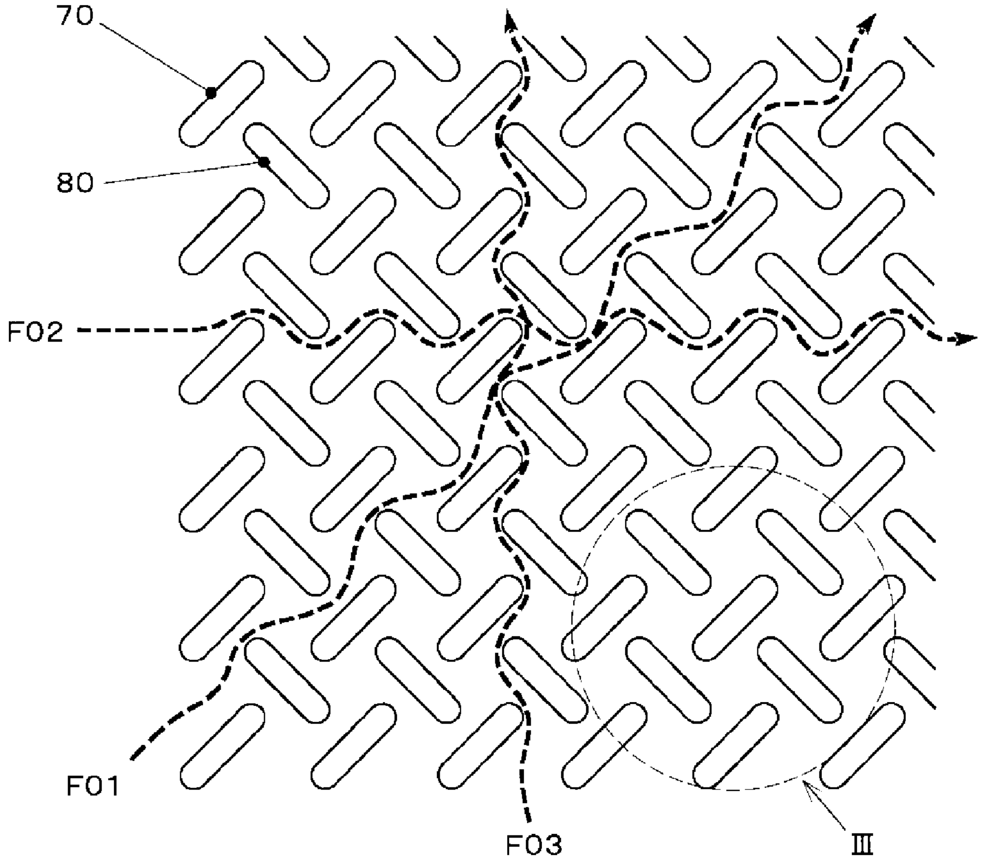
FIG. 2 illustrates arrangement of first ribs and second ribs formed on the water jacket of the first embodiment.

FIG. 2 illustrates arrangement of the first ribs 70 and the second ribs 80 formed on the water jacket of the first embodiment.

Figure 3:
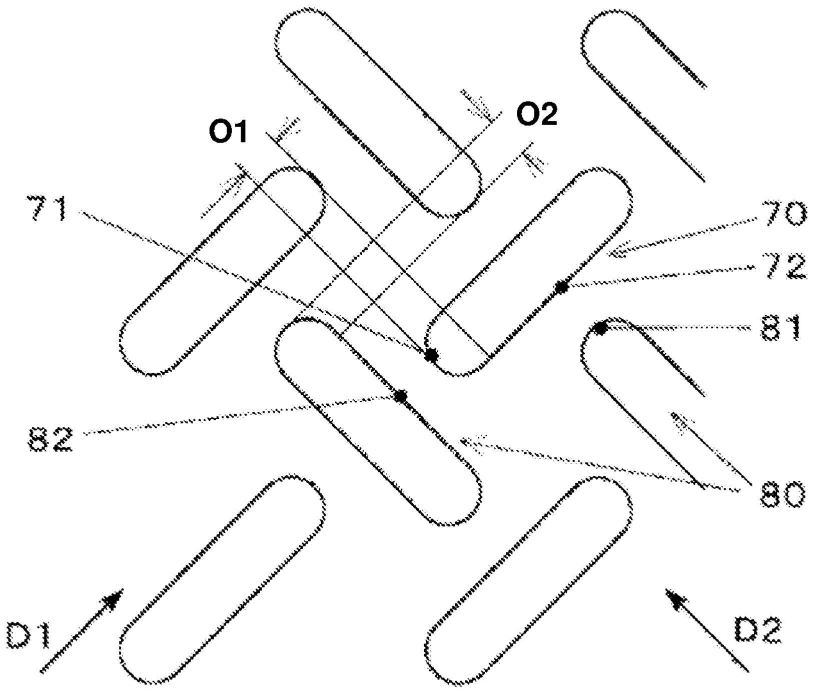
FIG. 3 is an enlarged view of a portion denoted by III in FIG. 2.

FIG. 3 is an enlarged view of the portion denoted by III in FIG. 2.

FIGS. 2 and 3 illustrate the first and second ribs when viewed in a normal direction of the wall surface. This also applies to FIGS. 4, 5, 6, 7, and 9, which will be described later.

The first rib 70 and the second rib 80 are formed as plate-shaped protruding walls extending along respective predetermined longitudinal directions.

In the present disclosure, the longitudinal direction of each rib refers to a direction in which the dimension of the each rib is maximum when the each rib is viewed in a normal direction of the wall surface that is a base of the each rib.

The first rib 70 and the second rib 80 respectively have ends 71 and 81 in the longitudinal directions. The ends 71 and 81 are rounded so as to have a circular arc shape when viewed in the normal direction of the wall surface.

The first ribs 70 are linearly aligned at equal intervals along the longitudinal direction, thereby forming a row. A large number of these rows, each including plural first ribs 70, are provided in parallel to each other at equal intervals.

These rows each including the plural first ribs 70 are disposed such that the aligned first ribs 70 of one row are deviated relative to the first ribs 70 of adjacent rows by a half pitch.

The second ribs 80 are linearly arranged at equal intervals along the longitudinal direction of the second ribs 80, thereby forming a row. The longitudinal direction of the second ribs 80 are orthogonal to the longitudinal direction of the first ribs 70. A large number of these rows each including plural second ribs 80 are provided in parallel to each other at equal intervals.

These rows each including the plural second ribs 80 are disposed such that the aligned second ribs 80 of one row are deviated relative to the second ribs 80 of adjacent rows by a half pitch.

As illustrated in FIG. 3, when the first rib 70 is viewed in a longitudinal direction D2 of the second rib 80, an end of the first rib 70 of a front row and an end of the first rib 70 of a rear row overlap each other by a predetermined overlap amount O1.

When the second rib 80 is viewed from a longitudinal direction D1 of the first rib 70, an end of the second rib 80 of a front row and an end of the second rib 80 of a rear row overlap each other by a predetermined overlap amount O2.

The end 71 of the first rib 70 faces an intermediate part 82 of the adjacent second rib 80 in the longitudinal direction D1 of the first rib 70.

The end 81 of the second rib 80 faces an intermediate part 72 of the adjacent first rib 70 in the longitudinal direction D2 of the second rib 80.

The first ribs 70 and the second ribs 80 appear alternately when viewed in the longitudinal direction D1 of the first rib 70. Also, the first ribs 70 and the second ribs appear alternately when viewed in the longitudinal direction D2 of the second rib 80.

Effects of the first embodiment will be described below in contrast with comparative examples 1 and 2 of the disclosure described below.

In the comparative examples 1 and 2 described below and in second and third embodiments described later, the components common to those in the foregoing embodiment are denoted by the same reference numerals and signs to omit duplicate description, and the differences will be mainly described.

Figure 4:
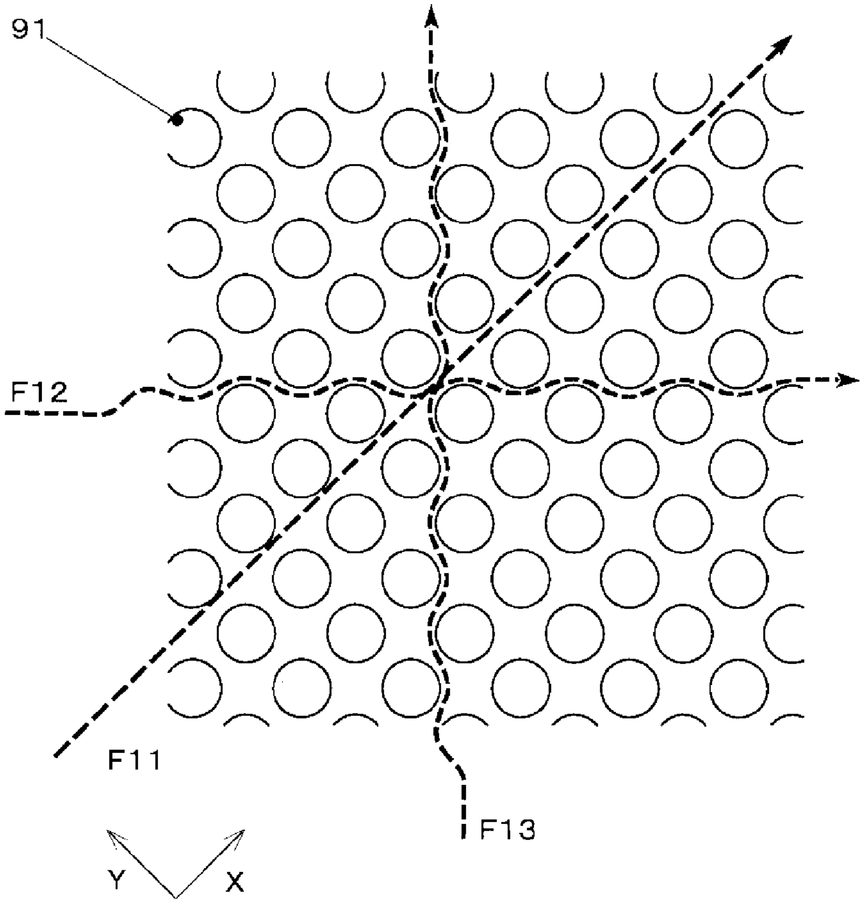
FIG. 4 illustrates arrangement of protrusions formed on a water jacket of a cooling apparatus of a comparative example 1.

FIG. 4 illustrates arrangement of protrusions formed on a water jacket of a cooling apparatus of the comparative example 1.

In the cooling apparatus of the comparative example 1, hemispherical protrusions 91 are arranged instead of the first ribs 70 and the second ribs 80 of the first embodiment.

The protrusions 91 are arranged at equal intervals along two orthogonal axes of an X-Y direction illustrated in FIG. 4.

In the comparative example 1, a flow F11 having a main flow direction along the X direction hardly generates turbulence.

Flows F12 and F13 having a main flow direction inclined by 45 degrees relative to the X direction and the Y direction generate some amount of turbulence, but the intensity of the turbulence is relatively small.

Figure 5:
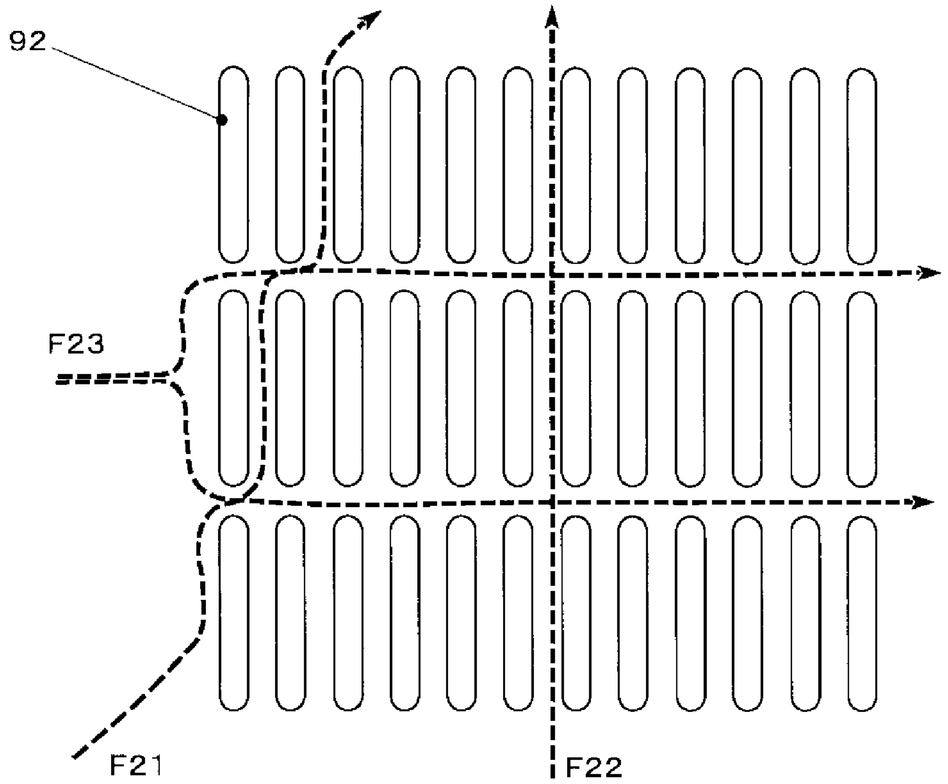
FIG. 5 illustrates arrangement of ribs formed on a water jacket of a cooling apparatus of a comparative example 2.

FIG. 5 illustrates arrangement of ribs formed on a water jacket of a cooling apparatus of the comparative example 2.

In the cooling apparatus of the comparative example 2, ribs 92 are arranged in place of the first ribs 70 and the second ribs 80 of the first embodiment. The ribs 92 extend in the same direction along a straight line.

The ribs 92 are arranged at equal intervals respectively along the longitudinal direction and a direction orthogonal to the longitudinal direction.

In the comparative example 2, a flow F21 having a main flow direction inclined relative to the longitudinal direction of the ribs 92 generates turbulence, thereby increasing the surface flow velocity.

On the other hand, a flow F22 having a main flow direction along the longitudinal direction of the ribs 92 hardly generates turbulence.

A flow F23 having a main flow direction orthogonal to the longitudinal direction of the ribs 92 hardly generates turbulence and increases pressure loss, thereby increasing resistance against the coolant passing through the water jacket.

In contrast, in the first embodiment as illustrated in FIG. 2, each of flows F01 to F03 generates turbulence without excessively increasing pressure loss. The flow F01 has a main flow direction along the longitudinal direction of the first ribs 70. The flows F02 and F03 have main flow directions inclined by 45 degrees relative to the longitudinal direction of the first ribs 70.

Figure 6:
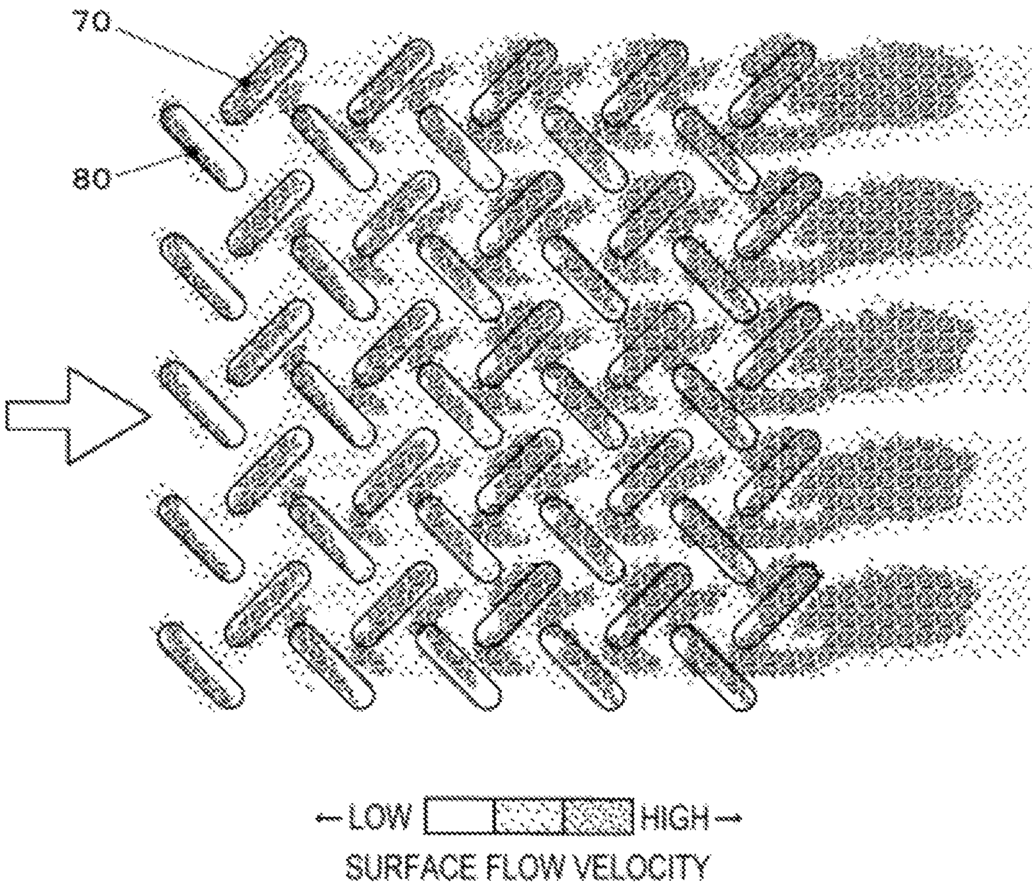
FIG. 6 illustrates a flow rate distribution of coolant on a surface of the water jacket of the first embodiment.

FIG. 6 illustrates a flow rate distribution of the coolant on the surface of the water jacket of the first embodiment.

FIG. 6 illustrates that a flow has a flow direction inclined by 45 degrees relative to the longitudinal directions of the first ribs 70 and the second ribs 80 flows into the water jacket. The main flow direction is indicated by an arrow in the drawing. The darker color represents higher surface flow velocity.

As illustrated in FIG. 6, in the first embodiment, turbulence is generated each time the flow successively passes through the first ribs 70 and the second ribs 80, resulting in increase in the surface flow velocity downstream of the flow.

This improves a coefficient of heat transfer from the cylinder head to the coolant, thereby increasing the received-heat amount of the coolant.

As described thus far, the first embodiment provides the following effects.

(1) The first rib 70 and the second rib 80 extending in the respective directions are alternately arranged on the wall surface of the water jacket 1. This structure makes the coolant having a main flow in any direction hit a side surface of at least one of the first ribs 70 or the second ribs 80 to generate turbulence.

Turbulence is reliably generated, and the velocity of the flow on the wall surface is increased. Thus, the coefficient of heat transfer from the cylinder head to the coolant is improved, thereby increasing the received-heat amount of the coolant.

Increasing the received-heat amount of the coolant improves the cooling condition of the combustion chamber. Thus, abnormal combustion, such as knocking, is suppressed, and an ignition timing is advanced, thereby improving the thermal efficiency of the engine.

Moreover, the cooling capacity relative to the exhaust port is improved, whereby the temperature of exhaust gas and the temperature of catalyst are decreased. This makes it possible to set the air-fuel ratio to a lean side to improve fuel economy.

Furthermore, the temperature of the coolant after cold start is rapidly raised. The warmed coolant may be used to heat oil of the engine and of the transmission, or other device, to warm up these devices rapidly. This decreases friction, thereby improving fuel economy of the vehicle.

(2) The end 71 of the first rib 70 faces the intermediate part 82 of the second rib 80 in the longitudinal direction D1 of the first rib 70. The end 81 of the second rib 80 faces the intermediate part 72 of the first rib 70 in the longitudinal direction D2 of the second rib 80. Thus, the first ribs 70 and the second ribs 80 are highly densely arranged, thereby increasing the surface area that contributes to the cooling capacity and facilitating generation of turbulence.

(3) When viewed from the longitudinal direction D1 of the first rib 70, the second rib 80 on a front side and the second rib 80 on a rear side partially overlap each other. When viewed from the longitudinal direction D2 of the second rib 80, the first rib 70 on a front side and the first rib 70 on a rear side partially overlap each other. This structure reliably curves the flow direction when the coolant passes through a gap between the first rib 70 and the second rib 80 in the coolant flowing along the wall surface of the water jacket 1. That is, there is hardly any region through which the coolant straightly passes. Thus, generation of turbulence is more facilitated.

(4) The longitudinal direction D1 of the first ribs 70 and the longitudinal direction D2 of the second ribs 80 are orthogonal to each other. Thus, regardless of the main flow direction of the coolant relative to the wall surface, turbulence is sufficiently generated.

Second Embodiment

A description will be hereinafter made on a cooling apparatus according to a second embodiment of the disclosure.

The cooling apparatus of the second embodiment includes the first ribs 70 and the second ribs 80 that are provided on each of paired wall surfaces facing each other across the coolant passage of the water jacket 1. The positional relationship between the first ribs 70 and the second ribs 80 on the paired wall surfaces is as described below.

Figure 7:
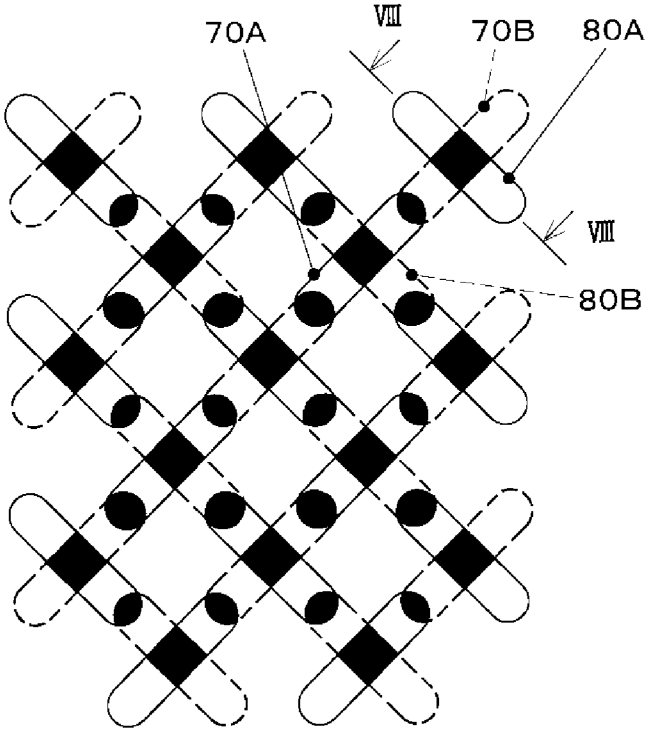
FIG. 7 illustrates arrangement of the first ribs and the second ribs in a water jacket of a cooling apparatus of a second embodiment of the disclosure.

FIG. 7 illustrates arrangement of the first ribs 70 and the second ribs 80 in the water jacket of the cooling apparatus of the second embodiment.

FIG. 7 illustrates the arrangement when viewed in a normal direction of one of the wall surfaces that face each other.

The first ribs 70 and the second ribs 80 that are provided on one wall surface are denoted by adding a subscript "A" and are illustrated by solid lines. The first ribs 70 and the second ribs 80 that are provided on the other wall surface are denoted by adding a subscript "B" and are illustrated by dashed lines. This also applies to the case in FIG. 9, which will be described later.

The first ribs 70A and 70B that are provided on the respective wall surfaces have the same longitudinal direction. The second ribs 80A and 80B that are provided on the respective wall surfaces have the same longitudinal direction.

The first rib 70A that is provided on the one wall surface and the second rib 80B that is provided on the other wall surface are disposed such that a center part of the first rib 70A and a center part of the second rib 80B overlap each other when viewed from a normal direction of the one wall surface.

The second rib 80A that is provided on the one wall surface and the first rib 70B that is provided on the other wall surface are disposed such that a center part of the second rib 80A and a center part of the first rib 70B overlap each other when viewed from the normal direction of the one wall surface.

FIG. 7 illustrates portions at which the ribs of the one wall surface overlap the ribs of the other wall surface, by painting out in black. This also applies to the case in FIG. 9, which will be described later.

Figure 8:
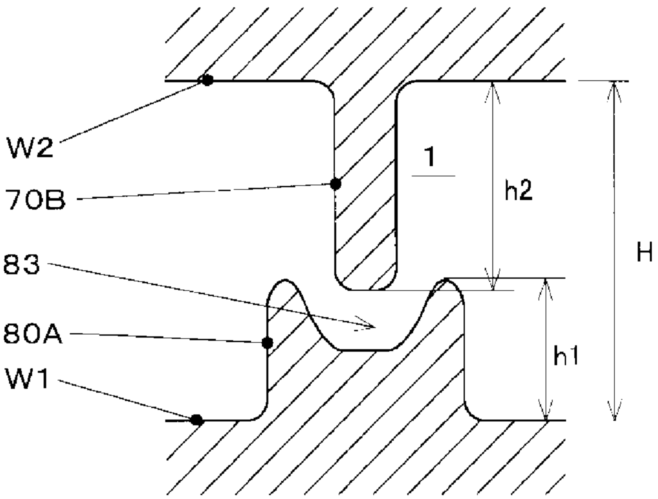
FIG. 8 is a cross sectional view of the VIII-VIII part in FIG. 7 when viewed in a direction indicated by arrows.

FIG. 8 is a cross sectional view of the VIII-VIII part in FIG. 7 when viewed in a direction indicated by arrows.

As illustrated in FIG. 8, the total of a protruding height h1 of the second rib 80A from one wall surface W1 and a protruding height h2 of the first rib 70B from the other wall surface W2 is greater than the height H between the wall surfaces W1 and W2 in the water jacket 1.

Thus, the tip part of the second rib 80A on the wall surface W1 is formed with a recess 83 for avoiding interference with the first rib 70B on the wall surface W2.

The recess 83 is formed in a partial region of the tip part or of a ridge part of the second rib 80A such that the protruding height of the partial region from the wall surface W1 is decreased relative to the rest part.

Although not illustrated in the drawing, the first rib 70A on the wall surface W1 is also formed with a recess similar to that of the second rib 80A.

As described thus far, the second embodiment provides the following effects in addition to effects similar to those of the first embodiment.

(1) The first ribs 70A and the second ribs 80A are formed on the wall surface W1, and the first ribs 70B and the second ribs 80B are formed on the wall surface W2. The wall surfaces W1 and W2 have the coolant passage of the water jacket 1 therebetween. This structure more facilitates generation of turbulence.

(2) The first rib 70A on the wall surface W1 is formed with a recess, such as the recess 83, for avoiding interference with the second rib 80B protruding from the other wall surface W2. The second rib 80A on the wall surface W1 is formed with a recess, such as the recess 83, for avoiding interference with the first rib 70B protruding from the other wall surface W2. This structure enables densely arranging the ribs that protrude from each of the wall surfaces W1 and W2, so as to overlap each other in the protruding directions. Thus, the coolant is not intercepted, and generation of turbulence is further facilitated.

Third Embodiment

A description will be hereinafter made on the cooling apparatus according to a third embodiment of the disclosure.

Figure 9:
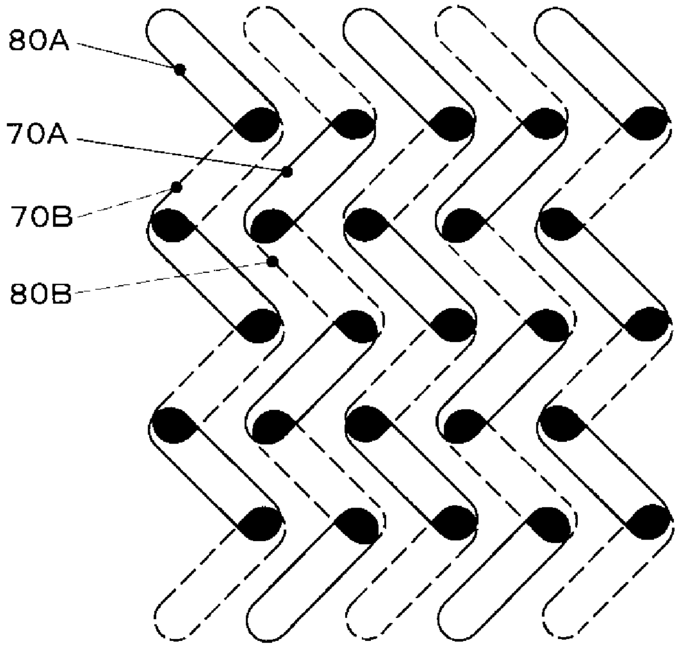
FIG. 9 illustrates first ribs and second ribs in a water jacket of a cooling apparatus of a third embodiment of the disclosure.

FIG. 9 illustrates arrangement of the first ribs 70 and the second ribs 80 of the water jacket of the cooling apparatus of the third embodiment.

The first ribs 70A provided on one wall surface and the second ribs 80B provided on the other wall surface are disposed such that an end of each first rib 70A and an end of a corresponding one of the second ribs 80B overlap each other when viewed from a normal direction of the one wall surface.

The second rib 80A provided on the one wall surface and the first rib 70B provided on the other wall surface are disposed such that an end of each second rib 80A and an end of a corresponding one of the first ribs 70B overlap each other when viewed from the normal direction of the one wall surface.

Such arrangement in the third embodiment makes a region in which the first ribs 70 and the second ribs 80 that protrudes from the respective wall surfaces interfere with each other, smaller than that in the second embodiment. This region is illustrated as a black painted out region in each of FIGS. 7 and 9.

It is assumed that the surface area is increased by 33.6% using the rib arrangement of the second embodiment, compared with that of a flat plate structure without the first ribs 70 and the second ribs 80. In this case, the surface area is increased by 39.6% using the rib arrangement of the third embodiment on the condition that the first ribs 70 and the second ribs 80 having the same protruding height and the same length as the first rib 70 and the second rib 80 of the second embodiment, compared with that of the flat plate structure.

As described thus far, the third embodiment provides the following effects in addition to effects similar to those of the first and the second embodiments. Compared with the second embodiment, the third embodiment decreases a region in which the first ribs 70 and the second ribs 80 that respectively protrude from the opposing wall surfaces, interfere with each other. The third embodiment also decreases the dimensions of the recesses, which are provided to avoid interference between the first rib 70 and the second rib 80. Thus, large surface areas of the first rib 70 and the second rib 80 are obtained, thereby increasing the received-heat amount of the coolant.

Modification Example

The present disclosure is not limited to the foregoing embodiments. Various modifications and changes may be made, and these modifications and changes also fall within the technical scope of the embodiments of the disclosure.

(1) Each of the embodiment uses the cooling apparatus to cool a cylinder head of an engine, for example. However, the cooling apparatus according to the embodiment of the disclosure may be used to cool another device to be cooled that has a part to be heated or a heat generating part.

For example, the cooling apparatus may be used in a cylinder block of an engine, various kinds of electric devices such as a motor, an inverter, and a battery, and other various kinds of devices.

(2) The structure of the cooling apparatus is not limited to that described in each of the foregoing embodiments and may be changed or modified as desired.

For example, in each of the embodiments, the first ribs and the second ribs are formed by casting as one body with the cylinder head that is to be cooled, in each of the embodiments. The manufacturing method of the first ribs and the second ribs is not limited thereto. In one example, a fin that is made as a separated part may also be casted, or the first ribs and the second ribs may be attached to a molded workpiece for the device to be cooled.

(3) The cooling apparatus of each of the embodiments uses liquid containing water as a main component, as coolant. However, the liquid is not limited thereto, and other liquid may be used as the coolant.

According to the embodiments of the disclosure, the ribs extending in the respective directions are alternately arranged on the wall surface of the coolant passage. This structure makes the coolant having a main flow in any direction hit the side surface of at least one of the ribs to generate turbulence of the coolant. Thus, turbulence is reliably generated, whereby the velocity of the flow on the wall surface is increased. As a result, the coefficient of heat transfer from the device to be cooled, to the coolant, is improved, and the received-heat amount of the coolant is increased.

The first ribs and the second ribs are highly densely arranged, thereby increasing the surface area that contributes to the cooling capacity and facilitating generation of turbulence.

The flow direction is reliably curved when the coolant passes through the gap between the first ribs and the second ribs during flowing along the wall surface of the coolant passage. That is, there is hardly any region through which the coolant straightly passes. Thus, generation of turbulence is more facilitated.

Moreover, regardless of the main flow direction of the coolant relative to the wall surface, turbulence is sufficiently generated.

The first ribs and the second ribs are formed on both wall surfaces that have the coolant passage therebetween. This structure more facilitates generation of turbulence.

The ribs are densely arranged so as to protrude from the respective wall surfaces while overlapping each other in the protruding directions. Thus, the coolant is not intercepted, and generation of turbulence is further facilitated.

Reduced is the region in which the first ribs and the second ribs protruding from the opposing wall surfaces interfere with each other. Also, decreased is the dimensions of the recesses, which are provided to avoid interference between the first ribs and the second ribs. Thus, large surface areas of the first ribs and the second ribs are obtained, thereby increasing the received-heat amount of the coolant.

As describes above, each of the embodiments of the disclosure provides the cooling apparatus having the coolant passage from which the coolant receives a large amount of heat regardless of the direction of the coolant flowing in the coolant passage.

The invention claimed is:

1. A cooling apparatus comprising:

a coolant passage provided in a device to be cooled, the coolant passage being configured in such manner that coolant passes through the coolant passage, wherein the coolant passage comprises a first wall surface, a second wall surface opposite the first wall surface;

a plurality of first ribs, and a plurality of second ribs, each second rib having a tip part defining a recess, wherein the first wall surface and the second wall surface define a wall height therebetween, the first ribs protrude from the first wall surface toward inside of the coolant passage a first height and extend in a first direction, the second ribs protrude from the second wall surface toward the inside of the coolant passage a second height and extend in a second direction crossing the first direction, the first ribs and the second ribs extending in the first direction and the second direction respectively are disposed alternately when viewed in at least one direction of the second ribs, the first ribs and the second ribs are arranged on the first wall surface and the second wall surface on an exhaust side of an intake port passing member, when viewed in a normal direction of the first wall surface, the first ribs and second ribs at least partially overlap each other, and when viewed in a direction parallel to the first wall surface, a combined height of the first height and the second height is greater than the wall height such that each first rib extends into the recess of a respective second rib of the plurality of second ribs, whereby the liquid coolant is restricted from passing through gaps between the first ribs and the second ribs in a straight path.

2. The cooling apparatus according to claim 1, wherein an end of each first rib faces an intermediate part of a corresponding one of the second ribs in a longitudinal direction of the first ribs, and an end of each second rib faces an intermediate part of a corresponding one of the first ribs in a longitudinal direction of the second ribs.

3. The cooling apparatus according to claim 2, wherein when viewed in the longitudinal direction of the first ribs, one of the second ribs on a front side and another one of the second ribs on a rear side partially overlap each other, when viewed in the longitudinal direction of the second ribs, one of the first ribs on a front side and another one of the first ribs on a rear side partially overlap each other.

4. The cooling apparatus according to claim 3, wherein the longitudinal direction of the first ribs and the longitudinal direction of the second ribs are orthogonal to each other.

5. The cooling apparatus according to claim 2, wherein the longitudinal direction of the first ribs and the longitudinal direction of the second ribs are orthogonal to each other.

6. The cooling apparatus according to claim 2, wherein when viewed in a normal direction of the first wall surface, adjacent first ribs of the plurality of first ribs partially overlap each other and adjacent second ribs of the plurality of second ribs partially overlap each other.

7. The cooling apparatus according to claim 1, wherein when viewed in a longitudinal direction of the first ribs, one of the second ribs on a front side and another one of the second ribs on a rear side partially overlap each other, when viewed in a longitudinal direction of the second ribs, one of the first ribs on a front side and another one of the first ribs on a rear side partially overlap each other.

8. The cooling apparatus according to claim 7, wherein the longitudinal direction of the first ribs and the longitudinal direction of the second ribs are orthogonal to each other.

9. The cooling apparatus according to claim 1, wherein a longitudinal direction of the first ribs and a longitudinal direction of the second ribs are orthogonal to each other.

10. The cooling apparatus according to claim 1, further comprising additional first ribs protruding from the second wall surface and additional second ribs protruding from the first wall surface, wherein when viewed in a normal direction of the first wall surface, a first end of each first rib on the first wall surface and a first end of a corresponding one of the second ribs on the second wall surface overlap each other, and when viewed in a normal direction of the first wall surface, a second end of each additional second rib on the first wall surface and a second end corresponding one of the additional first ribs on the second wall surface overlap each other.

11. The cooling apparatus according to claim 10, wherein when viewed in a normal direction of the first wall surface, adjacent first ribs of the plurality of first ribs partially overlap each other and adjacent second ribs of the plurality of second ribs partially overlap each other.

12. The cooling apparatus according to claim 1, wherein the first ribs and the second ribs have rounded ends comprising a circular arc shape when viewed in a normal direction of the first wall surface.

13. The cooling apparatus according to claim 1, wherein the first ribs are arranged at equal intervals along a longitudinal direction thereby forming a row of first ribs, the second ribs are arranged at equal intervals along the longitudinal direction thereby forming a second row of second ribs, and the longitudinal direction of the second ribs are approximately orthogonal to the longitudinal direction of the first ribs.

14. The cooling apparatus according to claim 13, wherein the row of first ribs are disposed such that adjacent rows of first ribs are deviated relative to the row of first ribs, and the second row of second ribs are disposed such that adjacent rows of second ribs are deviated relative to the second row of second ribs.

15. The cooling apparatus according to claim 1, further comprising an inlet port provided at a lower part of the cooling passage, wherein the liquid coolant is configured to be introduced into the cooling passage via the inlet port.

16. The cooling apparatus according to claim 15, further comprising a pump and a cylinder block passage formed in a cylinder block, the pump being configured to send the coolant into the cooling passage via the cylinder block passage.

17. The cooling apparatus according to claim 15, further comprising:

an exhaust port; and a plurality of exhaust port passing members provided between the inlet port and the exhaust port.

18. The cooling apparatus according to claim 15, further comprising:

an exhaust port; and a plurality of intake port passing members provided between the inlet port and the exhaust port.

19. The cooling apparatus according to claim 1, wherein the cooling passage comprises at least one of an ignition plug passing member and an injector passing member.

20. The cooling apparatus according to claim 1, wherein when viewed in a normal direction of the first wall surface, adjacent first ribs of the plurality of first ribs partially overlap each other and adjacent second ribs of the plurality of second ribs partially overlap each other.

* * * * *